United States Patent [19]

Muyres et al.

[11] Patent Number: 5,005,895

[45] Date of Patent: Apr. 9, 1991

[54] ADJUSTABLE VISOR

[75] Inventors: David A. Muyres, Saugatuck; Wesley D. Mersman, Holland; Steven P. Dykstra; Russell L. Clark, both of Zeeland, all of Mich.

[73] Assignee: Prince Corporation, Holland, Mich.

[21] Appl. No.: 509,505

[22] Filed: Apr. 16, 1990

[51] Int. Cl.$^5$ .............................................. B60J 3/02
[52] U.S. Cl. .................................................... 296/97.8
[58] Field of Search ................... 296/97.8, 97.1, 97.4, 296/97.5

[56] References Cited

U.S. PATENT DOCUMENTS

| D. 281,413 | 11/1985 | Prince et al. | D12/191 |
|---|---|---|---|
| 1,820,292 | 9/1930 | Wright | 296/97.4 |
| 2,201,197 | 1/1938 | Minor, Jr. | |
| 2,596,873 | 8/1950 | Solmes | 296/97 |
| 2,948,566 | 2/1959 | Massey | 296/97 |
| 4,169,552 | 10/1979 | Lichtenstein et al. | 296/97 |
| 4,323,275 | 4/1982 | Lutz | 296/97 |
| 4,363,513 | 12/1982 | Sahar | 296/140 |
| 4,558,899 | 12/1985 | Chu et al. | 296/97 |
| 4,623,188 | 11/1986 | Juraschek et al. | 296/97.8 |
| 4,681,363 | 7/1987 | Hemmeke et al. | 296/97 |
| 4,783,111 | 11/1988 | Hemmeke et al. | 296/97 |
| 4,818,011 | 4/1989 | Cherian | 296/97 |
| 4,929,017 | 5/1990 | Clark et al. | 296/97.8 |

Primary Examiner—Robert R. Song
Attorney, Agent, or Firm—Price, Heneveld, Cooper, DeWitt & Litton

[57] ABSTRACT

A visor body includes a guide for receiving a slide member having an auxiliary shield made of a flexible material which can be moved from a collapsed stored position to an extended position when the slide member is moved from its retracted position within the visor body to an extended use position increasing the width of the visor. In an alternative embodiment, the visor body itself is split into two sections which are slidably interfitted to allow them to extend away from one another for providing an increased width visor for added sunblocking capability.

22 Claims, 5 Drawing Sheets

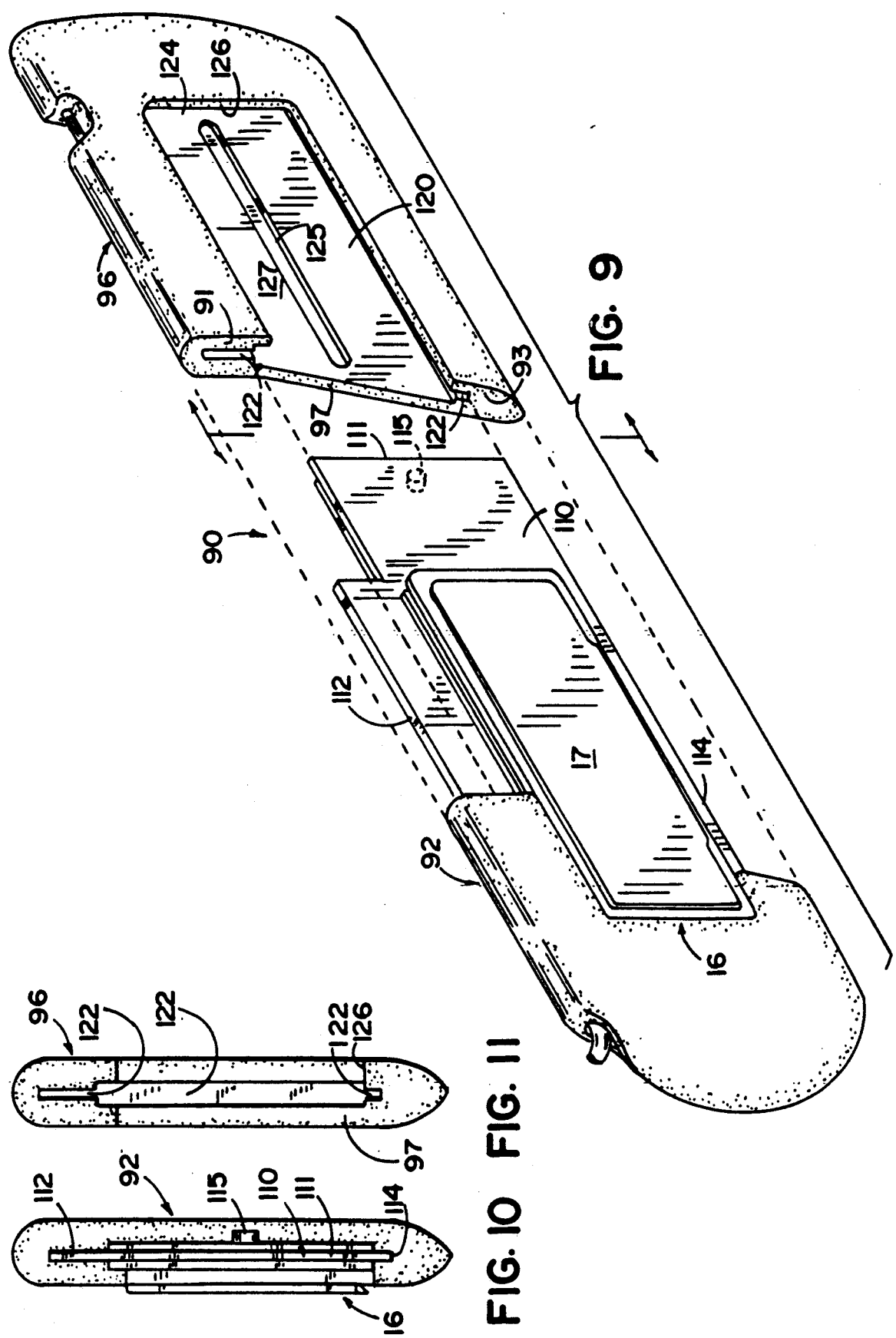

ADJUSTABLE VISOR

BACKGROUND OF THE INVENTION

The present invention pertains to a vehicle visor and particularly one which adjustably extends the coverage of a visor.

There exist a wide variety of patents disclosing either primary or secondary visors which include different mechanisms for extending the visor coverage. Design U.S. Pat. No. 281,413 shows a visor design in which a pocket is provided in the visor body from which a molded polymeric blade can be slidably extended U.S. Pat. Nos. 4,681,363 and 4,873,111 disclose supplemental visors which include panels having extendable blades for providing greater coverage for the visors shown. Other visors use sleeves which are adapted to fit over existing visors as exemplified by U.S. Pat. No. 2,201,197 and other somewhat complicated and bulky configurations in which one or more auxiliary panels are added to an existing visor.

In addition, there exist roll-up or collapsible visors themselves which have been used as primary or secondary visors. An example of an accordion-folded secondary visor is disclosed in U.S. Pat. No. 4,558,899 while an example of a roll-up type visor with side guide members is disclosed in U.S. Pat. No. 1,820,292. These constructions, however, pertain to the visor shape itself as opposed to a standard visor with the ability to vary its width.

In providing extended coverage for an existing visor, the only known commercially manufactured device is that shown in design U.S. Pat. No. 281,413 which is assigned to the present assignee the extended blade, however, is significantly narrower than the visor body of this prior art. Also, the bulkiness of aftermarket-type visor extensions disclosed in the prior art interfere with the normal visor operation and particularly raising the visor to a stored positioned nested against the vehicle headliner In some vehicles the headliner includes a recessed pocket for a visor and an aftermarket sleeve adapted to be slid over a visor or somehow attached to the visor and including an extender panel does not allow the normal storage of an existing visor. Thus the structure disclosed by these prior art devices have not been usable by those skilled in the art in designing visors nor are they known to have met with commercial acceptability.

SUMMARY OF THE PRESENT INVENTION

The visors of the present invention, however, overcome the difficulties of such prior art visors by integrating into the visor body a shield which does not increase in any significant manner the shape of an existing commercial visor. This is achieved in one of the embodiments of the invention by providing a visor body with guide means for receiving a slide member having mounted thereto an auxiliary shield made of a flexible material which can be moved from a collapsed stored position to an extended use position when the slide member is moved from its retracted position within the visor body to an extended use position increasing the effective width of the visor. By providing material which can be collapsed within a relatively small space, a visor of the present invention can incorporate additional accessories within the visor itself, including for example, an illuminated vanity mirror package.

In an alternative embodiment of the invention, the visor body itself is split into two telescopic sections which are slidably interfitted to allow them to extend away from one another for providing an increased width visor for added sunblocking capability.

Thus with both embodiments of the invention, a visor having a conventional appearance which will fit in a normal vehicle environment as original equipment is provided and which does not require supplemental attachments to increase the width of the visor to provide improved coverage. The visors do so with relatively inexpensive and innovative guide means and a slide utilizing an unique shield mounted thereto to provide a high quality, functional adjustable visor while at the same time not occupying additional space used for auxiliary visor accessories.

These and other features, objects and advantages of the present invention, will become apparent upon reading the following description thereof together with reference to the accompanying drawings in which:

BRIEF DESCRIPTION OF THE DRAWINGS

FIG. 9 is an exploded perspective view of the visor shown in FIGS. 7 and 8;

FIG. 10 is a right end elevational view of the left section of the visor shown in FIG. 9; and FIG. 11 is a left end elevational view of the right section of the visor shown in FIG. 9

DETAILED DESCRIPTION OF THE PREFERRED EMBODIMENTS

Figure 1:
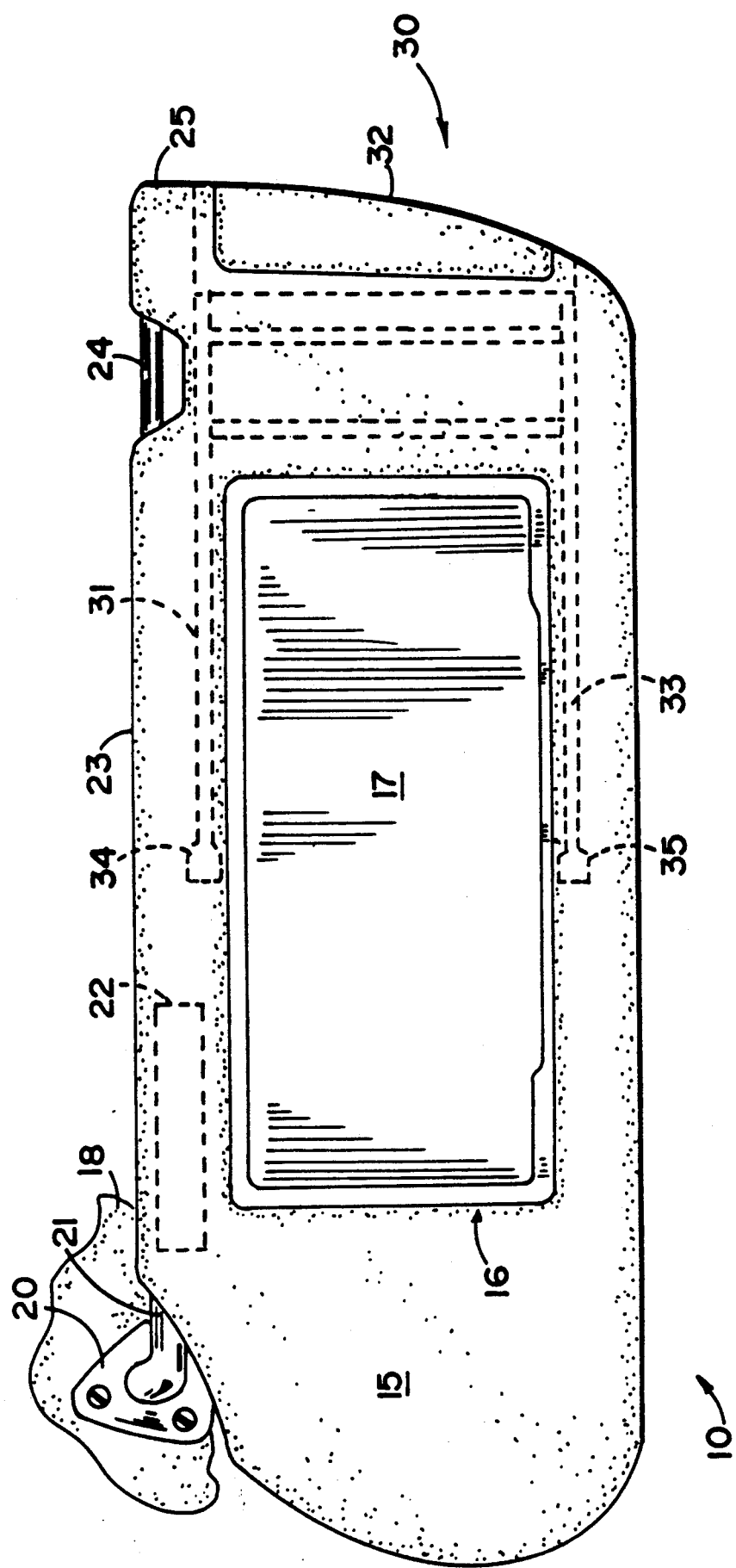
FIG. 1 is a front elevational view of a visor embodying the present invention.

Referring initially to FIGS. 1-4 there is shown a visor 10 for a vehicle which is of the type defined by a clamshell-type core 12 (FIG. 4) made of a first half 11 and the second half 13 which can be joined by an integral hinge 14. The halves are folded and bonded together or snapped together in a suitable fashion as for example disclosed in U.S. Pat. No. 4,763,946 issued on Aug. 16, 1988, the disclosure of which is incorporated herein by reference. Core 12 can be made of a number of materials including a molded polymeric material such as polypropylene covered by a suitable upholstery fabric 15 (FIG. 1) to provide a neat trim appearance to the visor. The visor 10 of the preferred embodiment includes an illuminated vanity mirror package 16 which can be of the type disclosed in U.S. Pat. No. 4,760,503, the disclosure of which is incorporated herein by reference. Package 16 includes a cover 17, a mirror under the cover and a pair of light sources on opposite sides of the mirror which are actuated upon opening of the cover and deactivated upon closure of the cover. The visor 10 is mounted to the roof 1 of a vehicle by means of an elbow bracket assembly 20 which can be of conventional construction and includes a visor pivot rod 21 extending within the visor core and terminating in a torque fitting 22 providing a predetermined rotational torque for the visor 10 between a lower use position as illustrated in FIG. 1 and a raised stored position against the vehicle roof 18. Torque device 22 can be of the type disclosed in U.S. Pat. No. 4,500,131.

Figure 2:
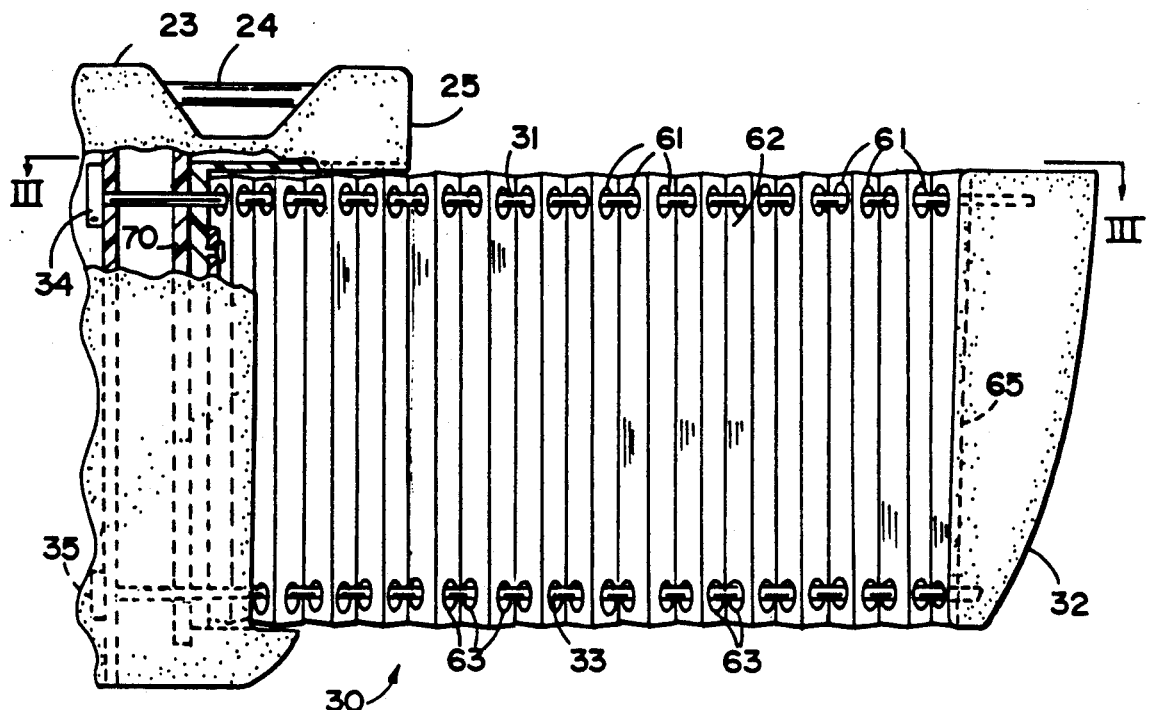
FIG. 2 is an enlarged fragmentary partly broken-away view of the visor shown in FIG. 1 shown with the auxiliary slide-out shield in an extended position.
Figure 3:
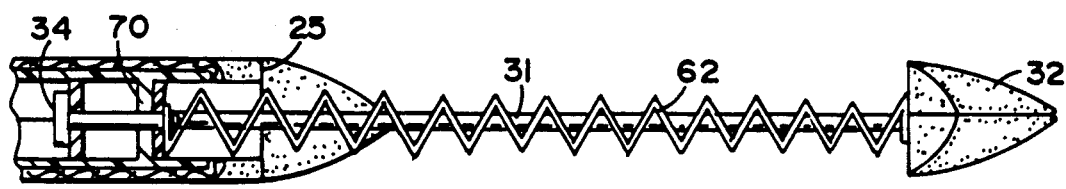
FIG. 3 is a cross-sectional view of the structure shown in FIG. 2 taken along section line III—III in FIG. 2.

The upper edge of 23 of the visor includes a mounting post 24 which fits into a resilient snap-clip mounted to the roof of the vehicle for assisting and storing the vehicle. Along the right edge 25 of the visor, there is provided a slide-out visor extension assembly 30 including a handle 32 for moving the slide-out visor extension between a retracted position as illustrated in FIG. 1 and an extended position as illustrated in FIGS. 2 and 3. The core 12 of the visor body accommodates the extension which comprises an auxiliary shield made of a collapsible material by providing guide means within the visor core 12 for receiving a slide which is associated with the auxiliary shield. The construction of the guide means, the slide and the auxiliary shield is now described in connection with FIGS. 2-4.

Figure 4:
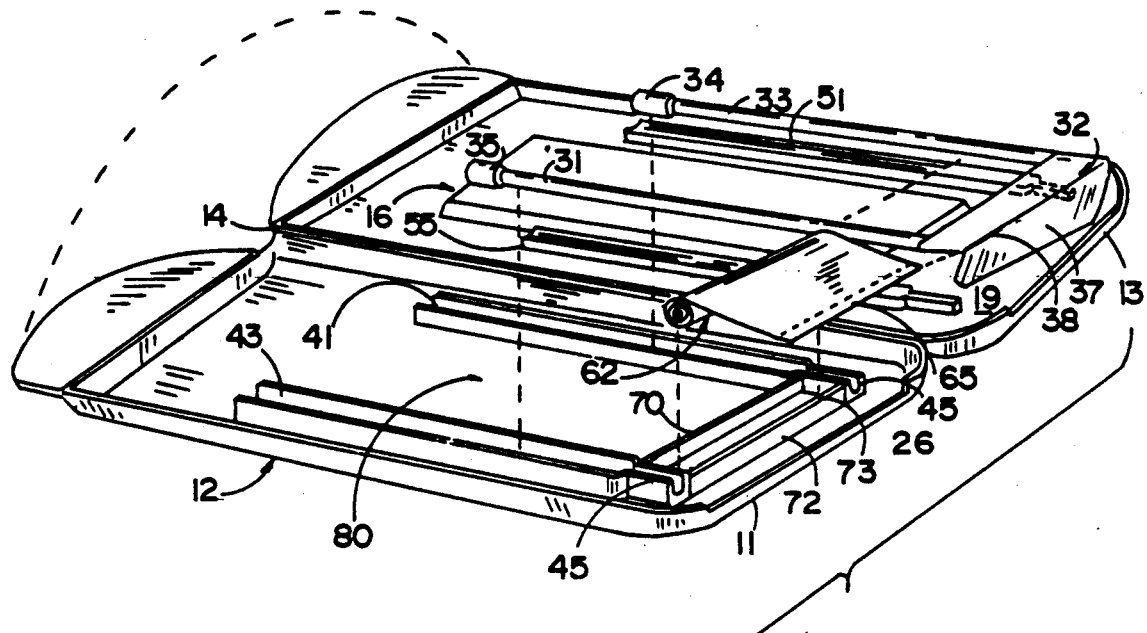
FIG. 4 is a perspective exploded view of the visor core shown in FIGS. 1-3 shown with an alternative shield member.

As best seen in FIGS. 2, 3 and 4, the auxiliary extension assembly 30 includes a slide assembly comprising the handle 32 at an exposed outer end and a pair of spaced elongated generally parallel extending arms 31 and 33 defining a slide. Members 31 and 33 are coupled at one end to handle 32 by mounting in recessed formed in the polymeric handle as shown in phantom form in FIG. 2 and are terminated at their end remote from handle 32 by integral enlarged stops 34 and 35, respectively, for preventing the slide to be completely withdrawn from tho visor body. Members 31 and 33 in a preferred embodiment are generally solid rod-shaped members of circular cross section which ride within the guide means formed in the visor body. The guide means in a preferred embodiment comprises a pair of channels 41 and 43 (FIG. 4) for receiving rods 31 and 33, respectively, in sliding engagement thereof which channels are integrally molded in the core half 11. Core half 13 includes mating cradle member 51 and 53 integrally formed in core half 13 to overlay and loosely enclose slide rods 31 and 33 within channels 41 and 43, respectively, thus captively holding the rods within the visor core. The end of channels 41 and 43 adjacent edge 25 of the visor have a reduced cross-sectional area as illustrated by areas 43 and 45 which engage the shoulders formed by stops 34 and 35 at their junction with slide members 31 and 33 to prevent withdrawal of the slide from the visor body.

Figure 6:
FIG. 6 is a cross-sectional view of the structure shown in FIG. 5 taken along section line VI—VI.
Figure 5:
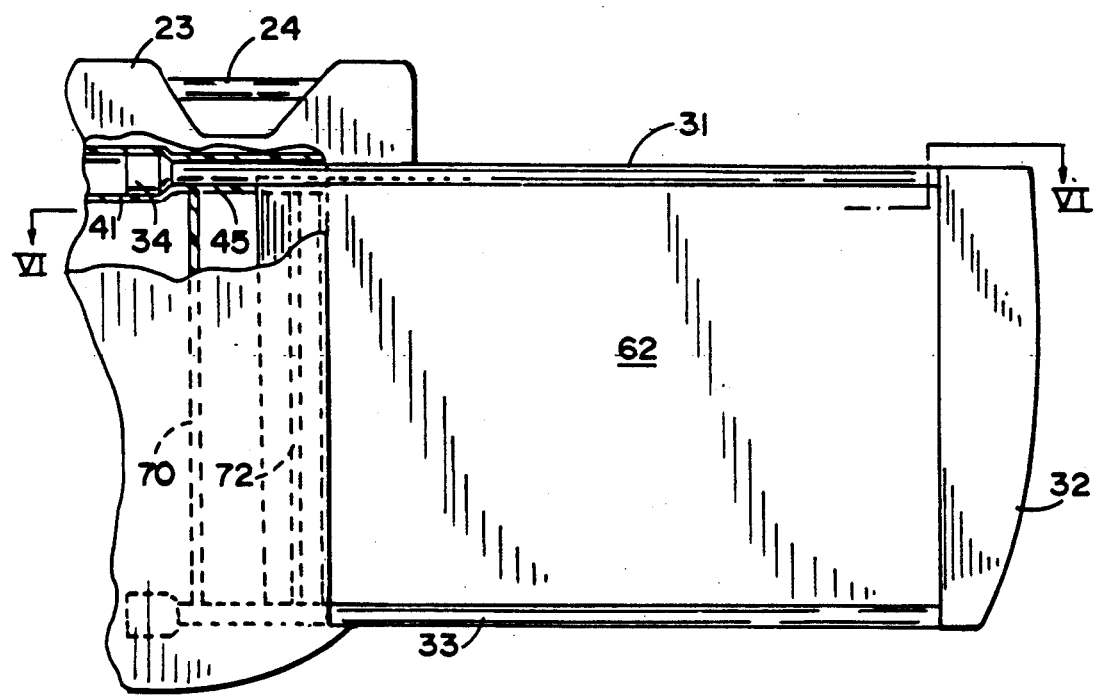
FIG. 5 is an enlarged fragmentary front elevational view of the assembled visor shown in FIG. 4 shown with the slide-out shield in an extended position.

The handle 32 can be molded in two sections as seen in FIG. 4 including a flap 37 which is integrally hinged to the base portion by polymeric hinge 38 such that it can captively receive an edge 65 of the flexible shield 62 which can be of the type shown in FIGS. 2 and 3, or the alternate form shown in FIGS. 4-6. In FIGS. 2 and 3 an accordion-folded sheet of polyester material having a plurality of circular apertures 61 extend over rod 31 and along one edge of shield 62 and a plurality of circular apertures 63 which extend over rod 33 for supporting the opposite edges of the flexible shield 62 so formed.

The shield member may be of any suitable material typically used in accordion-folded blinds such as polyester. As the handle 32 is withdrawn from the visor body 12, the accordion-folded shield 62 shown in FIGS. 2 and 3 moves from a collapsed position with overlying fold and positioned in immediate adjacent relationship to a retainer wall 70 extending across the inner edges of guide channels 41 and 43 to an extended position as illustrated in FIGS. 2 and 3.

In the alternative embodiment of the shield 62 illustrated in FIGS. 4-6, the flexible member 62 comprises a roll of Mylar film which is loosely cradled between wall 70 and a forward wall 72 (not employed in the embodiment shown in FIGS. 2 and 3) to be nestled therein. Wall 72 has sufficient space between its upper edge 73 and the inner surface 19 of core half 13 such that the Mylar film 62 can extend outwardly through a slot 26 in the edges 25 of the visor core 12. Slot 26 can be recessed as illustrated in FIGS. 1-3 or handle 32 can project outwardly from the slot if desired as illustrated in the FIGS. 4-6 embodiment employing the Mylar roll film 62.

Film 62 shown in FIGS. 4-6 has a permanent memory and therefore tends to roll up as the slide is moved from an extended position as illustrated in FIG. 2 with the alternative shield member to a retracted position as illustrated in FIG. 1. The memory of the Mylar film is not sufficient however to retract the slide once it is withdrawn from the visor body. The handle 32 in the embodiment illustrated either engages the edges of slot 26 as shown in FIGS. 1-3 or in the alternative arrangement shown in FIGS. 4-6, engages the wall 72 before the handle is fully retracted within the visor body thereby allowing the handle to remain in a partially extended position for easy gripping even with the auxiliary shield assembly 30 retracted for storage.

This construction captively holds the collapsible auxiliary shield in the area between walls 70 and 72 and provides a visor with a large open center area 80 (FIG. 4) suitable for the receipt of an illuminated vanity mirror package such as package 16 which is mounted within the core half 13. Not illustrated in connection with the core 12 shown in FIG. 4 is the means for mounting the torque fitting or the visor mounting post 24 shown in FIG. 1 which can be of the type illustrated in the above identified patents. These structural details are omitted for the purpose of more clearly illustrating the system of the present invention.

In connection with the Mylar film employed in the rolled material 62 shown in FIGS. 4-6, the Mylar can have a thickness of from about 0.005 to 0.030 inches and preferably about 0.020 inches and is formed by tightly rolling the film on a mandrel and heating for about 5 minutes at from about 225°-260° F. to take a set to retain in a rolled-up configuration. In such construction the edges of the Mylar need not be supported in the slide rods 31 and 33 as preferred with the accordion-folded material shown in FIGS. 2 and 3 but only extended closely adjacent the slide rods. The forward edge is captively held within the handle 32 by compressive gripping of the edge between the flap 37 and the base which is snap locked in position or otherwise suitably bonded closed to hold the leading edge of the roll material 62. As the extension 30 is moved from a retracted position as illustrated in FIG. 4 to an extended position such as illustrated in FIGS. 2 and 3 the Mylar film will extend outwardly and lay in a substantially flat plane between guide rods 31 and 33 sufficient to provide substantial blockage of sunlight therethrough. For such purpose, the material 62 in all embodiments can be opaque or darkly tinted as desired. Naturally the thickness of the Mylar film shown in the FIGS. 4–6 embodiment must be sufficient to prevent curling as the film is unrolled from the stored to extended position so that substantial coverage between the guide rollers 31 and 33 is provided.

Figure 7:
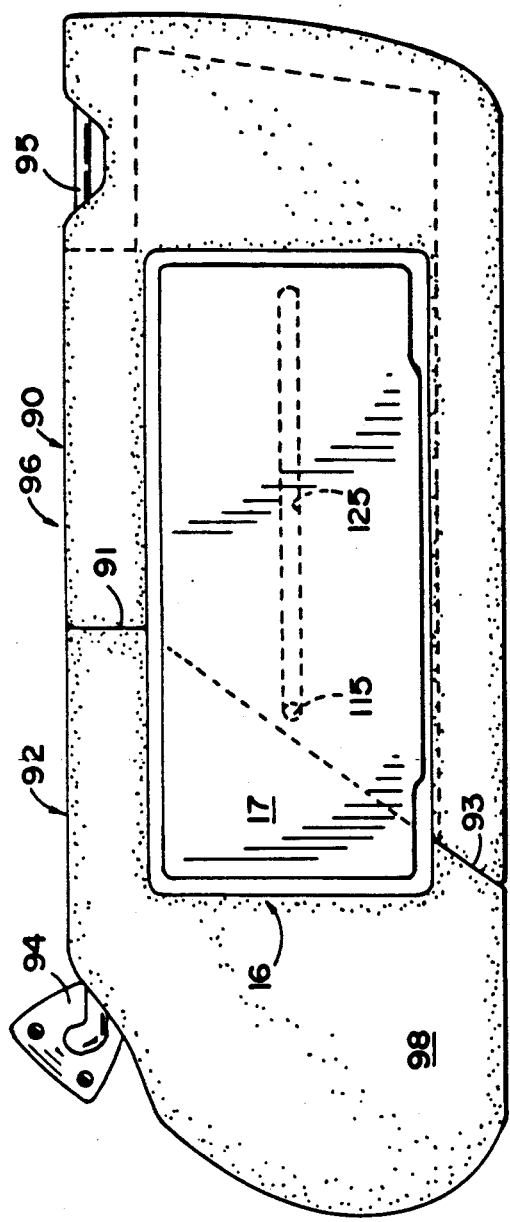
FIG. 7 is a front elevational view of a visor incorporating an alternative embodiment of the present invention.
Figure 8:
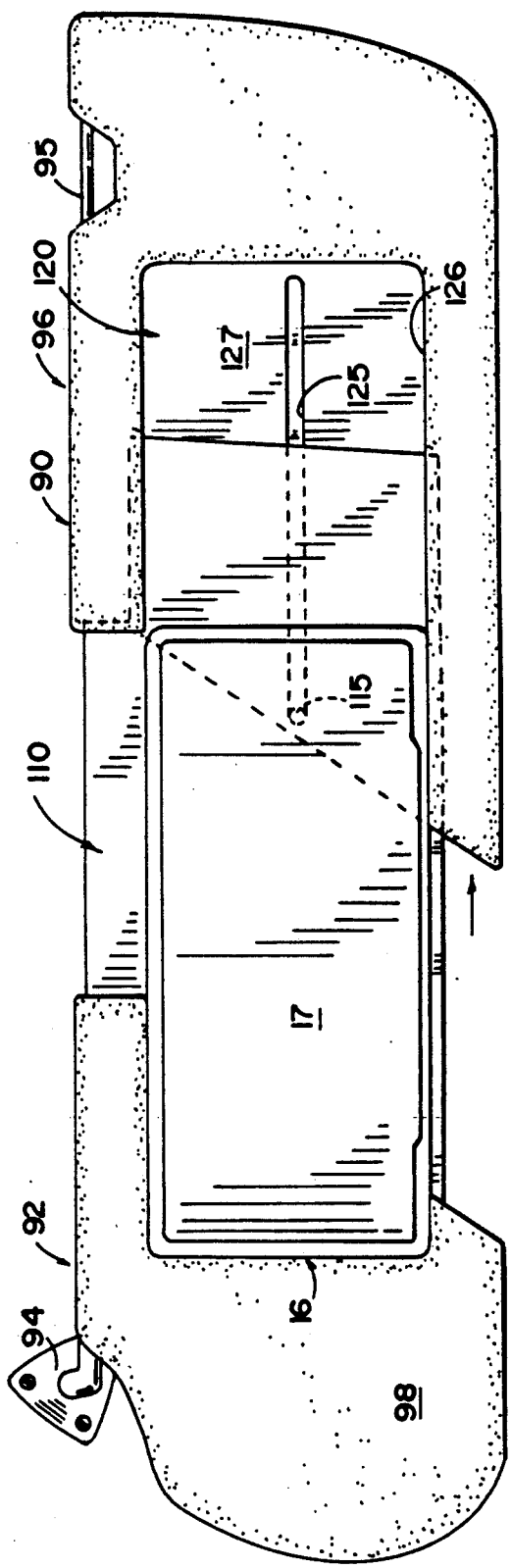
FIG. 8 is a front elevational view of the visor shown in FIG. 5 shown in an extended position for increased sunblocking coverage.

The visor shown in FIGS. 7–11 also provides variable width coverage for sunblocking and does so by splitting the visor into two telescopic sections. As seen in FIGS. 7 and 8, there is shown a visor 90 for use in a vehicle such as an automobile and including a split body divided generally in half including a section 92 which is stationary and mounted to the roof of a vehicle by means of an elbow bracket assembly 94. Telescopically mounted to section 92 is a second section 96 which as seen in FIG. 8 extends outwardly to one side for extension of the visor body when the visor is detached from the secondary support clip by disconnecting the auxiliary support rod 95 therefrom. Visor 90 as best seen in FIGS. 7 and 8 also includes an illuminated vanity mirror package 16 which is mounted in the half 92 and remains stationary with this visor half. An upholstery material 98 covers the two visors halves 92 and 96 and rounds the edge of an upper forward seam 91 and a lower forward seam 93 and a diagonally and offset rear seam 97 (FIG. 9) to provide a neat trim appearance of the visor when in a collapsed position as seen in FIGS. 7 and 8. Visor illuminated vanity mirror assembly 16 can also be of the same type as disclosed in the above identified U.S. Pat. No. 4,760,503. The illuminated vanity mirror insert 16 includes a spring biased cover 17 which is held in a closed position with the visor in a lower use position as illustrated in FIGS. 7–9 and can be moved to an open position in which the cover is held in a spring biased open position to uncover a mirror thereunder for use of the vanity mirror which includes illumination means for use under low light ambient conditions.

As seen in FIGS. 7–11, the left side 92 of visor 90 comprises the stationary male portion of the telescopic visor assembly with a support base 110 which extends within slots formed in visor section 96. Base 110 receives the vanity mirror package and includes means for receiving the torque control fitting such as that described above in connection with the FIGS. 1–4 embodiment. The base or blade 110 includes an upper longitudinally extending center guide rib 112 (FIGS. 9 and 11) and a lower longitudinally extending center guide rib 114 extending therealong. The back side of blade 110 includes a circular pin 115 near the leading edge 111 of member 110 which extends within a slot 125 formed in the body 120 of visor section 96. Pin 115 is best seen in FIG. 8 provides a stop such that the two telescopic sections cannot accidentally come apart when the visor is moved to its fully extended position.

Section 96 of visor 90 also includes a body portion 120 having a generally U-shaped internal peripheral channel 122 as best seen in FIGS. 9 and 11 which is shaped to supportably and guidably receive the ribs 112 and 114 of member 110. The flat rear wall 124 of member 120 is sufficiently thick to allow the longitudinal keeper slot 125 to be formed therein. Also as best seen in FIGS. 8 and 9, visor half 96 includes a generally rectangular recess 126 formed in the forward wall of body 120 which as seen in FIG. 7 surrounds the vanity mirror package 16 when the visor is in a collapsed position. When extended the surface 127 of panel 124 is visible and is therefore typically either in a dark color such as black or colored to match the color of the upholstery material 98 for the visor. The edge of panel 124 adjacent visor section 92 forms the diagonal seam 97 and as seen in FIG. 8 when in an open position provides sufficient overlap between sections 92 and 96 to provide stability for the two members when in the extended position. Thus with the visor fully extended, sufficient amount of the blade 110 still fits within the slot 122 and the rear surface of blade 110 engages sufficient amount of the front surface 127 of panel 124 to provide a rigid interconnecting structure.

Both the blade 110 and body 120 are suitably made of a molded polymeric material such as polypropylene, polyvinyl chloride or polycarbonate to provide a lubricious polymeric interface between the two sections where the ribs and channels interfit and provide a rigid yet smoothly telescopic structure. The upholstery material 98 wraps around the edges of both sections 92 and 96 of the visor to provide a neat trim appearance. The edges of the material can be heat fused or otherwise bonded by an adhesive material to provide the desired appearance. The visor may include a detent in the closed position for holding the visor in a snugly closed position or sufficient frictional engagement between the members provided by controlling the tolerances as known to those skilled in the art to adequately hold the visor in its collapsed normal use position as illustrated in FIG. 7. The vanity mirror assembly 16 can be attached to the blade 110 by the use of suitable conventional recessed fasteners so as not to interfere with the sliding action of the extension 96 with respect to member 92 or can be bonded to the polymeric frame member 110 utilizing an adhesive bonding agent if desired.

Thus with the systems of the present invention a conventional appearing visor is provided which includes an extension from one edge thereof to vary the width of the visor for use in blocking sun in the center windshield area near the rearview mirror or when the visor is pivoted to the side window position to extend the width of the visor for improved side window sunblocking performance. With the systems of the present invention the height of the extension (i.e. the minor access of the visor body itself) is substantially the same as that of the visor as opposed to providing a much narrower extension blade and thus provides significant sunblocking area when the visor is in its extended position.

It will become apparent to those skilled in the art that various modifications to the preferred embodiments of the invention can be made without departing from the spirit or scope thereof as defined by the appended claims.

The embodiments of the invention in which an exclusive property or privilege is claimed are defined as follows:

1. A vehicle visor having an adjustable width comprising:
   a pivot rod for attachment to a vehicle for supporting said visor;
   a visor body supported by said pivot rod having guide means formed within said body for receiving a slide member;
   said slide member movably supported by said guide means; and
   a collapsible shield mounted to said slide member for extension and retraction from said visor body with said shield collapsing into said visor body in a stored position and extending from said body with said slide member when in an extended position.

2. The visor as defined in claim 1 wherein said guide means comprises a pair of spaced generally parallel arms extending on opposite sides of a central area of said visor body, and a retainer member holding said shield adjacent a side of said visor such that a central area of the visor body is substantially open for the mounting of accessories thereto.

3. The visor as defined in claim 1 wherein said shield comprises an accordion-folded sheet material.

4. The visor defined in claim 3 wherein said slide member comprises a pair of guide arms and said sheet material includes apertures formed along opposite edges for receiving said arms for supporting said opposite edges of said material.

5. The visor as defined in claim 4 and further including a handle and wherein said arms comprise a pair of circular rods extending from opposite edges of said handle and extend within said guide means of said visor body.

6. The visor as defined in claim 5 wherein said visor body comprises a folded core and said guide means comprises a pair of guide channels integrally formed in one half of said core.

7. The visor as defined in claim 6 and further including stop means extending between said rods and said guide channels.

8. The visor as defined in claim 1 wherein said shield comprises a roll of polymeric material formed to include a memory to roll the material on itself such as said slide member is extended from said visor body and the roll of material unrolls to form a planar sheet and when said slide member retracts within the visor body, the material rolls into a compact package and means for mounting said roll adjacent an edge of said visor body.

9. The visor as defined in claim 8 wherein said mounting means defines a cavity formed in said visor body for captively holding said roll yet allowing said roll to rotate as the material unrolls during extension of said visor shield.

10. The visor as defined in claim 9 wherein said polymeric material comprises Mylar film having a thickness of from about 0.005 to 0.030 inches.

11. A vehicle visor having an adjustable width comprising:
 a first body portion having top and bottom edges and opposite ends adapted to be mounted to a vehicle by means of a pivot rod mounting assembly; and
 a second body portion having top and bottom edges and opposite ends slidably and telescopically integrally mounted to said first body portion and movable between a retracted position in which opposite ends of said first and second body portions abut and said top and bottom edges are aligned to define a visor having a first width and an extended position in which said ends of said first and second body portions are spaced from one another while said top and bottom edges of said body portions remain aligned to increase the overall width of said visor defined by said first and second body portions.

12. The visor as defined in claim 11 and further including stop means extending between said first and second body portions to prevent their separation as said second body portion is extended from said first body portion.

13. The visor as defined in claim 11 wherein one of said first and second body portions include a base having guide ribs extending along opposite edges thereof.

14. The visor as defined in claim 13 wherein the other of said first and second body portions include a peripheral slot for receiving said ribs of said one body portion for guidably coupling said visor body portions in telescopic relationship to one another.

15. The visor as defined in claim 14 wherein said first and second body portions are made of a lubricious polymeric material.

16. The visor as defined in claim 15 wherein one of said first and second body portions has a diagonal shaped interfacing edge and the other of said first and second body portions has a rectangular edge to maintain an overlapping relationship of said first and second body portions during the extension of said second body portion from said first body portion.

17. The visor as defined in claim 16 wherein said first body portion includes an illuminated vanity mirror package.

18. A vehicle visor having an adjustable width comprising:
 a visor body defined by upper and lower edges and side edges with means at the junction of an upper edge and one side edge for mounting said visor to a vehicle, said body having guide means formed within said body for receiving a slide member from an edge of said body opposite said one side edge; and
 said slide member being movably supported by said guide means to extend between a retracted position and an extended position increasing the width of said visor wherein said guide means comprises a pair of spaced generally parallel members extending on opposite sides of a central area of said visor body such that the central area of the visor body is substantially open for the mounting of accessories thereto.

19. The visor as defined in claim 18 wherein said slide member comprises a collapsible shield.

20. The visor as defined in claim 19 wherein said shield member comprises an accordion-folded sheet material.

21. The visor as defined in claim 19 wherein said shield comprises a roll of polymeric material formed to include a memory to roll the material on itself such as said slide member is extended from said visor body the roll of material unrolls to form a planar sheet and when said slide member retracts within the visor body, the material rolls into a compact package and means for mounting said roll adjacent an edge of said visor body.

22. The visor as defined in claim 18 wherein said slide member comprises a second body which telescopically engages said visor body.

* * * * *